(12) United States Patent
Takeuchi et al.

(10) Patent No.: US 8,368,284 B2
(45) Date of Patent: Feb. 5, 2013

(54) DIELECTRIC ACTUATOR

(75) Inventors: Hiromitsu Takeuchi, Aichi-ken (JP); Yukihisa Ueno, Aichi-ken (JP); Naoto Kuriyama, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 718 days.

(21) Appl. No.: 12/461,811

(22) Filed: Aug. 25, 2009

(65) Prior Publication Data

US 2010/0066203 A1    Mar. 18, 2010

(30) Foreign Application Priority Data

Sep. 12, 2008    (JP) ................................. 2008-234126

(51) Int. Cl.
*H02K 1/00* (2006.01)
*H01L 41/083* (2006.01)
*H01L 41/18* (2006.01)

(52) U.S. Cl. ...................................................... 310/309

(58) Field of Classification Search .................. 310/309, 310/328, 364, 800
See application file for complete search history.

(56) References Cited

U.S. PATENT DOCUMENTS

| 4,885,783 A | * | 12/1989 | Whitehead et al. | ............ 381/191 |
| 5,831,371 A | * | 11/1998 | Bishop | .......................... 310/328 |
| 6,447,879 B1 | | 9/2002 | Sakurai et al. | |
| 6,783,796 B2 | | 8/2004 | Sakurai et al. | |
| 2007/0075355 A1 | | 4/2007 | Hamada et al. | |

FOREIGN PATENT DOCUMENTS

| JP | 3-28767 | 3/1991 |
| JP | 10-150234 | 6/1998 |
| JP | 2002-034273 A | 1/2002 |
| JP | 2005-527178 | 9/2005 |
| JP | 2006-82346 | 3/2006 |
| JP | 2007-103722 | 4/2007 |
| JP | 2008-053527 A | 3/2008 |
| JP | 2008-060599 A | 3/2008 |
| WO | WO 03/107523 A1 | 12/2003 |

OTHER PUBLICATIONS

Japanese Office Action dated Jun. 29, 2012 with English Translation Thereof.

* cited by examiner

*Primary Examiner* — Quyen Leung
*Assistant Examiner* — David Scheuermann
(74) *Attorney, Agent, or Firm* — McGinn IP Law Group, PLLC

(57) ABSTRACT

A dielectric actuator 1 of the present invention has a structure in which an elastic, high-dielectric material portion 2 is held by elastic insulating material portions 3a and 3b and the elastic insulating material portions are held by electrodes 4a and 4b from the outside. A base material for the elastic, high-dielectric material portion 2 is formed of a silicon rubber and a graphite powder is mixed therein to apply a conductive property.

18 Claims, 2 Drawing Sheets

DIELECTRIC ACTUATOR

BACKGROUND OF THE INVENTION

1. Field of the Invention

The present invention relates to a dielectric actuator.

2. Description of the Related Art

When a high voltage is applied between a pair of electrodes with an elastic insulating material interposed the pair of electrodes, the elastic insulating material is polarized. Positive charge is accumulated in one of electrode surfaces opposed to each other and negative charge is accumulated in the other electrode surface. Since the electrodes attract one another due to a coulomb force acting between the charges, the elastic insulating material is crushed, and force and displacement occur extending in a direction of the electrode surface. Examples of dielectric actuators using such a phenomenon are described in Patent Documents 1 and 2.

In addition, Patent Documents 3 to 5 disclose the inventions relating to the present invention.

Patent Document 1: JP-T-2005-527178, claim 47
Patent Document 2: JP-A-2006-82346
Patent document 3: JP-UM-A-3-028767
Patent Document 4: JP-A-10-150234
Patent Document 5: JP-A-2007-103722

The present inventors have conducted intensive study to achieve an improvement in the force and displacement amount of the dielectric actuators having the above configuration. The higher the dielectric constant of an elastic insulating material and the smaller the distance between electrodes, the larger the amount of charge in an electrode surface. Accordingly, it is thought that the force and displacement amount of the dielectric actuators increase due to the increasing Coulomb attraction. From this viewpoint, first, the present inventors have studied using an elastic insulating material having an excellent insulating property and an excellent dielectric constant and reducing the distance between electrodes, as in the technique proposed in Patent Document 1 (see Paragraph number 0043 to 0045 in the same document).

In general, a dielectric elastic body of a high dielectric constant has a low insulating property. Thus, it is necessary to thicken an elastic insulating material in order to ensure the insulating property and the distance between electrodes thus increases, causing an antinomic problem.

A synthetic rubber is considered as a current applicable elastic insulating material for the dielectric actuators having the above configuration. Examples of the synthetic rubber include a silicone rubber, an acrylic rubber, an acryl-silicon copolymer rubber, a polyurethane rubber, a styrene-butadiene rubber, a chloroprene rubber, chlorosulfonated polyethylene, a nitrile rubber and the like. However, such rubber materials themselves do not have a high dielectric constant.

The present inventors thought of employing an unprecedented new method, in which an elastic material having a high dielectric constant with a poor insulating property and an elastic material having an excellent insulating property with a comparatively low dielectric constant are superimposed in layers, to solve the problem. That is, an elastic, high-dielectric material having a poor insulating property but having a high dielectric constant is obtained by mixing a conductive filler such as carbon in a synthetic rubber. The elastic, high-dielectric material is interposed between elastic insulating materials, having an excellent insulating property, in which a conductive filler is not mixed. After that, when a dielectric body in which the elastic, high-dielectric material is interposed between the elastic insulating materials is inserted between electrodes, a phenomenon is recognized in which a displacement amount with respect to an applied voltage is increased despite the increasing distance between the electrodes and the resulting reduced coulomb force (see FIG. 4 of Example).

SUMMARY OF THE INVENTION

A first aspect of the present invention defines the combination of such materials.

That is, provided is a dielectric actuator, in which a dielectric elastic body is interposed between a pair of electrodes opposed to each other and the dielectric elastic body is deformed through applying a voltage between the pair of electrodes. The dielectric elastic body includes an elastic, high-dielectric material portion and elastic insulating material portions, and the elastic insulating material portions are interposed between the elastic and high-dielectric material portion and the pair of electrodes.

According to the dielectric actuator of the first aspect, which is defined as seen from the above, the displacement amount with respect to the applied voltage is increased. In addition, the displacement amount of the dielectric actuator can be adjusted and controlled by selecting the material for the high-dielectric material portion.

A second aspect of the present invention is defined as follows. That is, in the dielectric actuator defined in the first aspect, the elastic and high-dielectric material portion is made of a conductive rubber material and the elastic insulating material portion is made of a first synthetic rubber material.

The conductive rubber material has a poor insulating property, but has a large dielectric constant. The synthetic rubber material has a very excellent insulating property. Accordingly, by combining the materials, the displacement amount with respect to the applied voltage can be increased.

A third aspect of the present invention is defined as follows.

That is, in the dielectric actuator defined in the second aspect, the base material of the conductive rubber material and the first synthetic rubber material are the same or the same kind of rubber materials. Herein, the same kind of rubber materials mean that constituent unit molecules of synthetic rubbers are the same as each other but different in molecular weight, or that the kinds of synthetic rubbers (for example, a diene synthetic rubber, a silicon synthetic rubber, a fluorine synthetic rubber, an acrylic synthetic rubber, an EPDM synthetic rubber, and the kinds of various copolymers of these synthetic rubbers) are the same.

The base material of the conductive rubber material for the elastic, high-dielectric material portion and the first synthetic rubber material as the material for the elastic insulating material portion are the same or the same kind, and thus high adhesion power can be ensured between the elastic, high-dielectric material portion and the elastic insulating material portion and the mechanical stability of the dielectric actuator as the dielectric elastic body is improved.

A fourth aspect of the present invention is defined as follows.

That is, in the dielectric actuator defined in the third aspect, the pair of electrodes are made of a conductive rubber material and the base material thereof is formed of the same or the same kind of rubber material as the first synthetic rubber material.

By using the electrodes made of the conductive rubber material, the electrodes obtain flexibility as well as a conductive property. Accordingly, even when the dielectric elastic body is deformed through applying a voltage, the electrodes are deformed in accordance with the above deformation. Furthermore, by employing the same or the same kind of material as the first synthetic rubber for the base material, high adhesion power can be ensured between the electrodes and the elastic insulating material portions. As a result, the mechanical stability of the dielectric actuator is improved.

A fifth aspect of the present invention is defined as follows.

That is, in the dielectric actuator defined in the third aspect, the rubber material is formed of a rubber of one or more kinds mixed together, selected from a silicon rubber, an acrylic rubber, an acryl-silicon copolymer rubber, a polyurethane rubber, a styrene-butadiene rubber, a chloroprene rubber, chlorosulfonated polyethylene and a nitrile rubber.

In the conductive rubber material, a conductive filler is dispersed in the first rubber material.

These rubber materials have an excellent insulating property and excellent durability and are suitable for use as the dielectric elastic body. Among them, a silicon rubber has very excellent weather resistance, heat resistance and chemical resistance and can be preferably used.

A sixth aspect of the present invention is defined as follows.

That is, in the dielectric actuator defined in the third aspect, the first synthetic rubber material is a silicon rubber and the conductive filler is a carbon powder.

The present inventors confirm that by using a silicon rubber as the synthetic rubber material and using a carbon powder as the conductive filler, the dielectric actuator in which the displacement amount with respect to the applied voltage is large can be achieved.

A seventh aspect of the present invention is defined as follows.

That is, in the dielectric actuator defined in any one of the first to sixth aspects, the interfaces between the elastic and high-dielectric material portion and the elastic insulating material portion are formed as convex and concave condition.

When the interfaces between the elastic, high-dielectric material portion and the elastic insulating material portion are formed as convex and concave condition, the adhesion strength between the elastic and high-dielectric material portion and the elastic insulating material portion is increased and thus they do not easily become peeled off from each other. Consequently, the mechanical stability of the dielectric actuator is improved.

An eighth aspect of the present invention is defined as follows.

That is, in the dielectric actuator defined in any one of the first to seventh aspects, the interface between the elastic insulating material portion and the electrode is formed as convex and concave condition.

When the interface between the elastic insulating material portion and the electrode is formed as convex and concave condition, the adhesion strength between the elastic insulating material portion and the electrode is increased and thus they do not easily become peeled off from each other. Consequently, the mechanical stability of the dielectric actuator is improved.

A ninth aspect of the present invention is defined as follows.

That is, in the dielectric actuator defined in any one of the first to eighth aspects, the elastic and high-dielectric body has the base material which is the same or the same kind of material as that of the elastic insulating body and the conductive filler is dispersed in the base material. The dispersion concentration of the conductive filler is low at the side of the elastic insulating body and is high at the center side.

In this case, since the change in material between the elastic, high-dielectric material portion and the elastic insulating material portion is small, the adhesion strength between the elastic and high-dielectric material portion and the elastic insulating material portion is improved. Consequently, the mechanical stability of the dielectric actuator is improved.

PREFERRED EMBODIMENTS OF THE INVENTION

Hereinafter, embodiments embodying the present invention will be described with reference to the drawings.

(First Embodiment)

Figure 1:
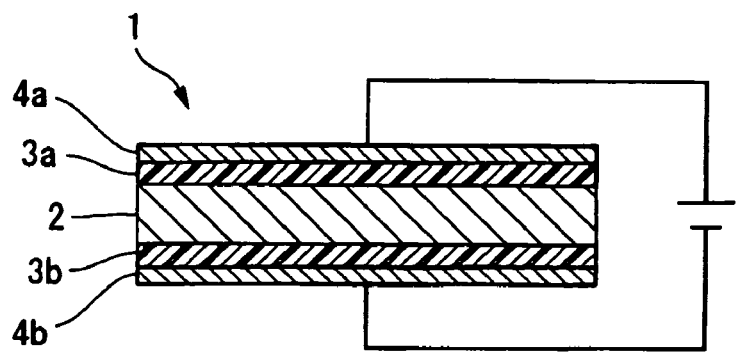
FIG. 1 is a schematic cross-section diagram of a dielectric actuator according to a first embodiment.

FIG. 1 is a cross-section diagram showing a dielectric actuator 1 according to a first embodiment. The dielectric actuator 1 has a structure in which an elastic and high-dielectric material portion 2 is held by elastic insulating material portions 3a and 3b and the elastic insulating material portions are held by electrodes 4a and 4b from the outside.

A base material for the elastic and high-dielectric material portion 2 is formed of one or more kinds of synthetic rubbers selected from a silicon rubber, an acrylic rubber, an acryl-silicon copolymer rubber, a polyurethane rubber, a styrene-butadiene rubber, a chloroprene rubber, chlorosulfonated polyethylene and a nitrile rubber. In addition, a conductive powder such as a metal powder or a carbon powder such as a graphite powder is mixed therein. It is preferable that the mixing ratio of the conductive powder is properly determined in view of the balance between a dielectric constant, a conductive property and a mechanical characteristic. In general, the mixing ratio is set in the range of 1 to 20 wt %, and preferably in the range of 3 to 10 wt %. When the ratio of a conductive powder exceeds 20 wt %, a dielectric constant increases, but flexibility of the elastic and high-dielectric material portion as an elastic body is reduced. Thus, the elastic and high-dielectric material portion becomes fragile or the displacement amount with respect to an applied voltage is reduced. When the ratio of a conductive powder is less than 1 wt %, the flexibility of the elastic and high-dielectric material portion as an elastic body is maintained, but the dielectric constant increasing effect is reduced. Thus, a displacement amount with respect to an applied voltage is reduced. In this manner, by mixing the conductive powder in the synthetic rubber, the dielectric constant of the synthetic rubber as a base material can be increased to 100 times or more the dielectric constant of a synthetic rubber in which a conductive powder is not mixed.

Also, for the elastic insulating material portions 3a and 3b, one or more kinds of synthetic rubbers selected from a silicon rubber, an acrylic rubber, an acryl-silicon copolymer rubber, a polyurethane rubber, a styrene-butadiene rubber, a chloroprene rubber, chlorosulfonated polyethylene and a nitrile rubber can be used. However, a conductive powder is not mixed therein. Materials for the elastic insulating material portions 3a and 3b may be different from each other.

For the electrodes 4a and 4b, metal such as Pt, Ir, Ru, Cu, Al, Au or Ag or a conductive polymer such as polyethylene-dioxythiophene or polyaniline can be used. Moreover, the electrodes may be formed by applying and drying, on the elastic insulating material portions 3a and 3b, a conductive paste in which a conductive powder such as a silver powder or a carbon powder is dispersed in a resin or an organic solvent. In addition, a conductive rubber material may be used for the electrodes 4a and 4b. Base materials for the electrodes may be different for each electrode or may be the same as each other. It is preferable that a conductive rubber material is used for the electrodes 4a and 4b. In this case, while the elastic and high-dielectric material portion 2 and the elastic insulating material portions 3a and 3b bend, the electrodes 4a and 4b can bend naturally in accordance with the bending. Accordingly, durability is increased.

In order to make the interfaces between the elastic and high-dielectric material portion 2 and the elastic insulating material portions 3a and 3b as convex and concave condition, the surface of the elastic and high-dielectric material portion 2 or the surfaces of the elastic insulating material portions 3a and 3b may be roughened to form convex and concave condition and a monomer for forming the elastic insulating material portions 3a and 3b or the elastic and high-dielectric material portion 2 may be then cast thereon. Or, irregularities may be provided on the surface of the elastic and high-dielectric material portion 2 or the surfaces of the elastic insulating material portions 3a and 3b and the surfaces may be then adhered to each other with an adhesive or the like. In this case, the adhesion area is increased and the adhesive power is thus increased. The elastic and high-dielectric material portion 2 and the elastic insulating material portions 3a and 3b do not easily become peeled off from each other and durability can be increased.

Similarly, in order to make the interfaces between the elastic insulating material portions 3a and 3b and the electrodes 4a and 4b as convex and concave condition, irregularities may be provided on the surfaces of the elastic insulating material portions 3a and 3b or the surfaces of the electrodes 4a and 4b, and the surfaces may then be adhered to each other with an adhesive or the like or a monomer for forming the elastic insulating material portions 3a and 3b may be then cast thereon. In this case, the adhesion area is increased and the adhesive power is thus increased. The elastic insulating material portions 3a and 3b and the electrodes 4a and 4b do not easily become peeled off from each other and durability is increased.

In the dielectric actuator 1 according to the first embodiment, which is configured as described above, the displacement amount with respect to an applied voltage is increased due to the combination of the elastic insulating material portions 3a and 3b and the elastic and high-dielectric material portion 2. Furthermore, by selecting the material for the high-dielectric material portion 2, the displacement amount of the dielectric actuator 1 can be adjusted and controlled.

(Second Embodiment)

Figure 2:
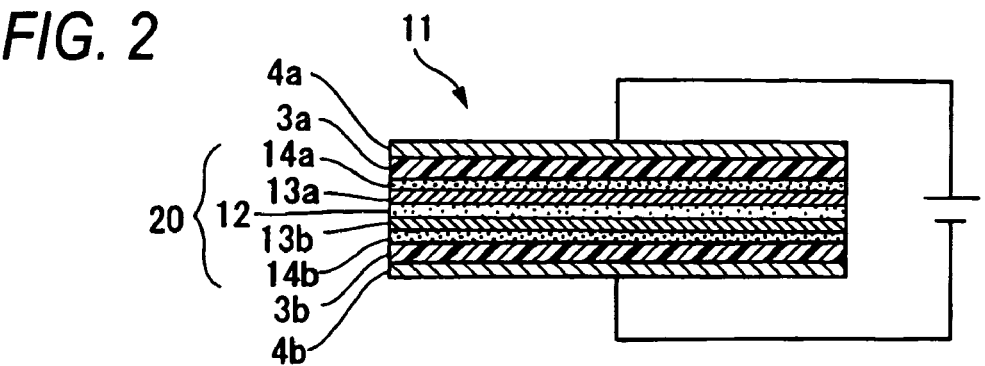
FIG. 2 is a schematic cross-section diagram of a dielectric actuator according to a second embodiment.

FIG. 2 is a cross-section diagram showing a dielectric actuator 11 according to a second embodiment. In the dielectric actuator 11, an elastic and high-dielectric material portion 20 in which a conductive powder is mixed in a rubber material is formed in a multilayer structure. A central elastic and high-dielectric material portion 12 as a central layer of the elastic and high-dielectric material portion is held by first high-dielectric material portions 13a and 13b and the first high-dielectric material portions are held by second high-dielectric material portions 14a and 14b from the outside to constitute the elastic and high-dielectric material portion 20. The mixing ratio of the conductive powder is set so that the mixing ratio in the high-dielectric material portion 12 is higher than the mixing ratio in the first high-dielectric material portions 13a and 13b and the mixing ratio in the first high-dielectric material portions 1 3a and 1 3b is higher than the mixing ratio in the second high-dielectric material portions 14a and 14b. The other configurations are the same as in the dielectric actuator according to the first embodiment, which is shown in FIG. 1. The same configurations will be denoted by the same reference numerals and a detailed description thereof will be omitted.

In the dielectric actuator 11 according to the second embodiment, the mixing ratio of the conductive powder in the elastic and high-dielectric material portion 20 is high in the central elastic and high-dielectric material portion 12, and is gradually lowered in an outward direction from the first high-dielectric material portions 13a and 13b toward the second high-dielectric material portions 14a and 14b. Accordingly, higher adhesive power can be ensured between the second high-dielectric material portions 14a and 14b and the elastic insulating material portions 3a and 3b. The reason for this is so that the change in the material between the second high-dielectric material portions and the elastic insulating materials becomes reduced.

EXAMPLES

Example 1

In Example 1, for the base materials for the elastic and high-dielectric material portion 2 and the elastic insulating material portions 3a and 3b in FIG. 1, the same kind of silicon rubbers (dielectric constant $\epsilon=2$) were used. For the elastic and high-dielectric material portion 2, a silicon rubber in which 5 wt % of a graphite powder was added was used. The dielectric constant $\epsilon$ of the silicon rubber, in which the graphite powder was added, was 200 and was about 100 times the dielectric constant of a silicon rubber in which nothing was added. The elastic and high-dielectric material portion 2 had a thickness of 200 μm and a size of 30 mm×30 mm. The elastic insulating material portions 3a and 3b were formed of a 50 μm thick silicon rubber board of the same kind, which was cut to have the same size as the elastic and high-dielectric material portion 2. A silver paste was applied and dried on the entire outer surfaces of the elastic insulating material portions 3a and 3b to form the electrodes 4a and 4b. With a jig (not shown), the elastic insulating material portions 3a and 3b held both sides of the elastic and high-dielectric material portion 2 to make a dielectric actuator of Example 1.

Comparative Example 1

Figure 3:
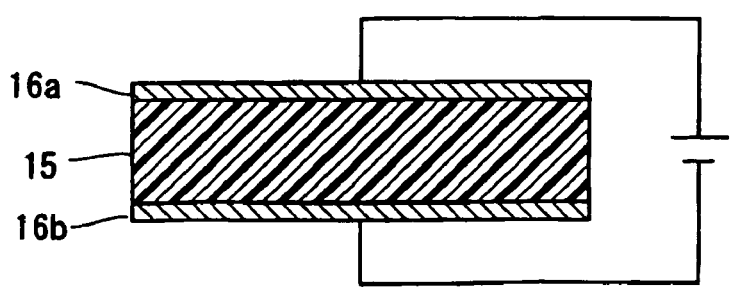
FIG. 3 is a schematic cross-section diagram of a dielectric actuator according to Comparative Example 1.

In Comparative Example 1, as shown in FIG. 3, a structure was prepared in which a dielectric material portion 15 made of an acrylonitrile-butadiene rubber (NBR) was held by electrodes 16a and 16b. The thickness of the dielectric material portion 15 was 220 μm. The dielectric constant $\epsilon$ of the acrylonitrile-butadiene rubber was 17.

<Evaluation>

Figure 4:
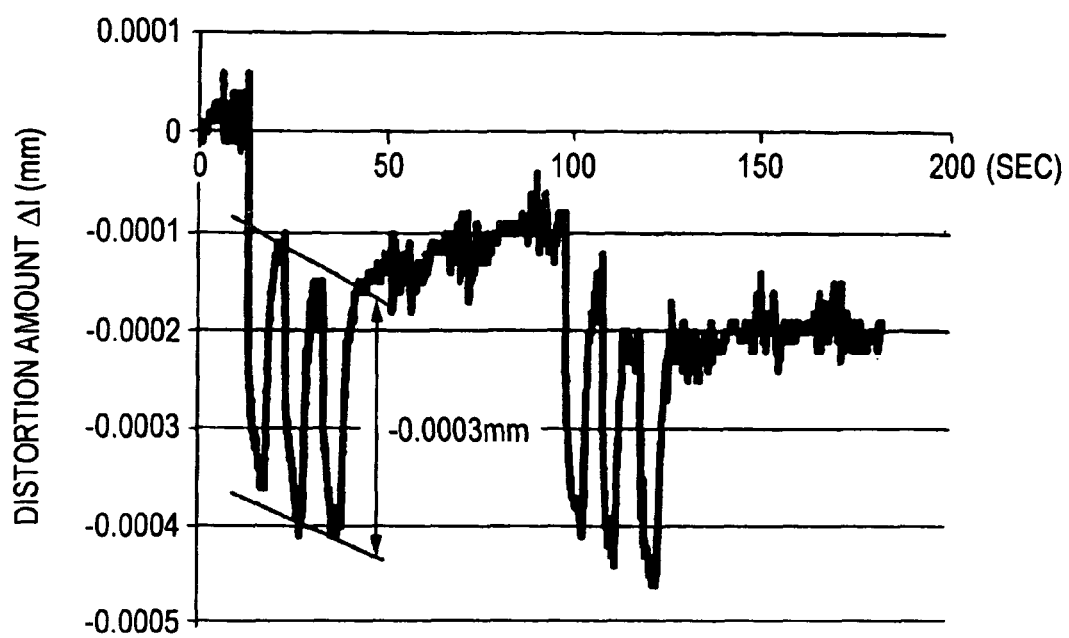
FIG. 4 is a graph showing the relationship between time and the displacement amount in a thickness direction when a voltage of 200 V is applied to a dielectric actuator according to Example 1.
Figure 5:
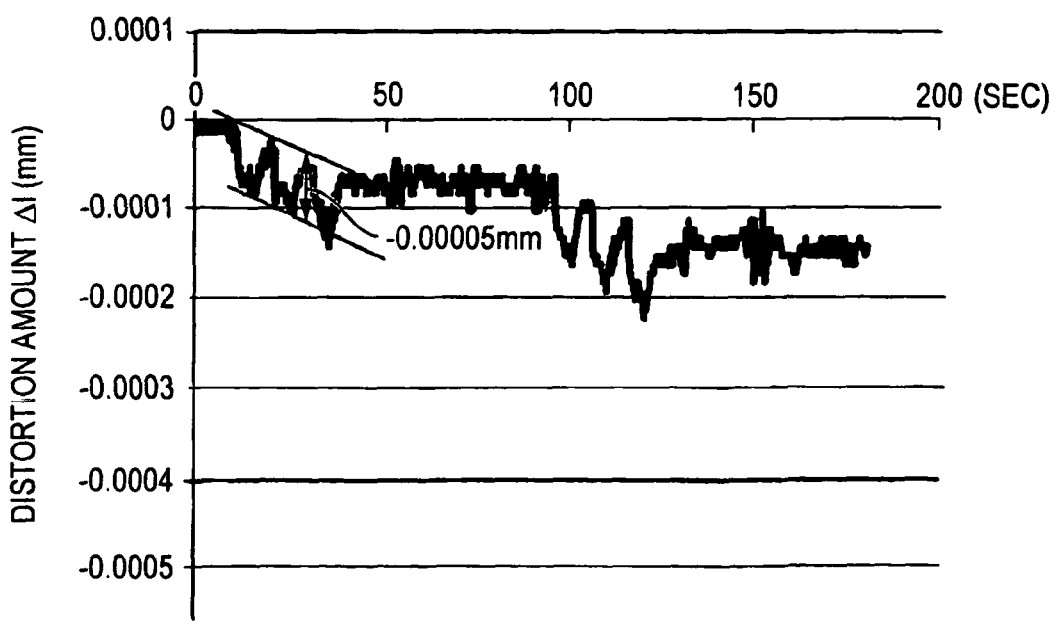
FIG. 5 is a graph showing the relationship between time and the displacement amount in a thickness direction when a voltage of 200 V is applied to the dielectric actuator according to Comparative Example 1.

A voltage of 2000 V was applied to the electrodes of the dielectric actuators of the above Example 1 and Comparative Example 1, and displacement amounts in a thickness direction at this time were measured by a laser displacement gauge. As a result, in the case of the dielectric actuator of Example 1, as shown in FIG. 4, a distortion amount in the thickness direction corresponded to −0.0003 mm of contraction. In the case of Comparative Example 1, as shown in FIG. 5, the distortion amount in the thickness direction corresponded to −0.00005 mm of contraction. Example 1 indicated 6 times the displacement of Comparative Example 1.

The present invention is not limited to the embodiments of the invention. Without departing from the scope of the claims, various modified forms easily conceived by those skilled in the art are also included in the invention.

What is claimed is:

1. A dielectric actuator, comprising:
   a pair of electrodes, the pair of electrodes being opposed to each other; and
   a dielectric elastic body interposed between the pair of electrodes, the dielectric elastic body being deformable through an application of a voltage between the pair of electrodes,
   wherein the dielectric elastic body includes an elastic and dielectric material portion and elastic insulating material portions
   wherein the elastic insulating material portions are interposed between the elastic and dielectric material portion and the pair of electrodes,
   wherein the elastic and dielectric material portion comprises a conductive rubber material,
   wherein the elastic insulating material portions comprise a first synthetic rubber material, and
   wherein a dielectric constant of the elastic and dielectric material portion is greater than a dielectric constant of the elastic insulating portion material.

2. The dielectric actuator according to claim 1, wherein the conductive rubber material comprises a second synthetic rubber material and a conductive filler.

3. The dielectric actuator according to claim 2, wherein a base material of the conductive rubber material and the first synthetic rubber material each comprise a same kind of rubber material.

4. The dielectric actuator according to claim 3, wherein the pair of electrodes comprise a conductive rubber material, and
   wherein a base material of the pair of electrodes comprises a same kind of rubber material as the first synthetic rubber material.

5. The dielectric actuator according to claim 3, wherein the rubber material comprises a rubber of one or more kinds mixed together, selected from a silicon rubber, an acrylic rubber, an acryl-silicon copolymer rubber, a polyurethane rubber, a styrene-butadiene rubber, a chloroprene rubber, chlorosulfonated polyethylene and a nitrile rubber.

6. The dielectric actuator according to claim 5, wherein the conductive rubber material comprises a silicon rubber and the conductive filler comprises a carbon powder.

7. The dielectric actuator according to claim 1, wherein interfaces between the elastic and dielectric material portion and the elastic insulating material portions are formed as a convex and a concave condition.

8. The dielectric actuator according to claim 1, wherein an interface between the elastic insulating material portions and the pair of electrode is formed as a convex and a concave condition.

9. The dielectric actuator according to claim 3, wherein the elastic and dielectric material portion comprises a pair of outer layers and an inner layer, a dispersion concentration of the conductive filler in the inner layers is higher than a dispersion concentration of the conductive filler in the outer layers.

10. The dielectric actuator according to claim 1, wherein the elastic and dielectric material portion has an insulating property that is less than an insulating property of the elastic insulating material portions.

11. A dielectric actuator, comprising:
    a pair of electrodes provided opposite to each other; and
    a dielectric elastic body configured to deform in response to a voltage being applied to the pair of electrodes, the dielectric elastic body being interposed between the pair of electrodes, and the dielectric elastic body comprising:
    a plurality of dielectric layers, said plurality of dielectric layers comprising an elastic material having a dielectric constant substantially greater in a central layer of the plurality of dielectric layers than in progressively outer layers of the plurality of dielectric layers; and
    a pair of insulating portions, a respective one of the pair of insulating portions being provided between a respective one of the pair of electrodes and a side of the plurality of dielectric layers.

12. The dielectric actuator according to claim 11, wherein the plurality of dielectric layers comprises a synthetic rubber material and conductive powder.

13. The dielectric actuator according to claim 12, wherein a ratio of the conductive powder is in a range of 1% to 20% by weight of the synthetic rubber.

14. The dielectric actuator according to claim 11, wherein the plurality of insulating portions comprises a synthetic rubber material.

15. The dielectric actuator according to claim 12, wherein the conductive powder comprises a graphite powder.

16. A dielectric actuator configured to deform in response to a voltage being applied to a pair of electrodes, the dielectric actuator comprising:
    said pair of electrodes provided opposite to each other;
    a plurality of dielectric layers provided between the pair of electrodes, said plurality of dielectric layers being elastic; and
    a pair of insulating portions, a respective one of the pair of insulating portions being provided between a respective one of the pair of electrodes and a side of the plurality of dielectric layers,
    wherein the plurality of dielectric layers has a dielectric constant substantially greater in a center layer thereof than in outer layers thereof.

17. The dielectric actuator according to claim 16, wherein the plurality of dielectric layers has a dielectric constant greater than 200.

18. The dielectric actuator according to claim 1, wherein said dielectric constant of the conductive rubber material is approximately 100 times greater than a dielectric constant of the first synthetic rubber material.

* * * * *